United States Patent [19]
Krakau

[11] 3,763,696
[45] Oct. 9, 1973

[54] APPARATUS FOR DETERMINING THE INTRAOCULAR PRESSURE

[76] Inventor: Carl Erik Torsten Krakau, Bengt Lidforssvagl, S 223 65 Lund, Sweden

[22] Filed: Sept. 15, 1971

[21] Appl. No.: 180,593

[30] Foreign Application Priority Data
Sept. 15, 1970 Sweden.............................. 12525/70

[52] U.S. Cl...................... 73/80, 73/67.1, 128/2 T
[51] Int. Cl............................................... A61b 9/00
[58] Field of Search............ 73/80; 128/2 T, 2.05 E, 128/2.05 N

[56] References Cited
UNITED STATES PATENTS
| | | | |
|---|---|---|---|
| 3,070,087 | 12/1962 | Sittel | 73/80 X |
| 3,192,765 | 7/1965 | Keiper | 73/80 |
| 3,308,653 | 3/1967 | Roth | 73/80 |
| 3,470,736 | 10/1969 | Bartfay | 73/80 |
| 3,487,679 | 1/1970 | Yamamori | 73/80 |

FOREIGN PATENTS OR APPLICATIONS
| | | | |
|---|---|---|---|
| 128,107 | 8/1959 | U.S.S.R. | 73/80 |
| 134,815 | 1/1960 | U.S.S.R. | 73/80 |
| 151,430 | 10/1961 | U.S.S.R. | 73/80 |

*Primary Examiner*—Richard C. Queisser
*Assistant Examiner*—John P. Beauchamp
*Attorney*—Richard C. Sughrue et al.

[57] ABSTRACT

An apparatus for determining the intraocular pressure is described which involves use of a probe contacting the eye and caused to carry out mechanical oscillations under the influence of a generator. The reactional pressure yielded by the eye when subjected to the oscillations of the probe is determined by means of a pressure-sensitive device connected between the generator and the probe.

5 Claims, 2 Drawing Figures

APPARATUS FOR DETERMINING THE INTRAOCULAR PRESSURE

BACKGROUND OF THE INVENTION

The present invention relates to an apparatus for determining in clinical applications the intraocular pressure of the human eye. Prior art equipment for that purpose, generally referred to as tonometers, are based on the principle of determining the pressure above discussed by measuring the deformation of the cornea when subjected to a predetermined external force or measuring the external force needed to cause a predetermined corneal deformation. Those prior art tonometers are, however, suffering from certain shortcomings. One such disadvantage is that the external force applied influences the cornea and, when the measuring is repeated or continuous, this influence causes a corresponding reduction of the accuracy of the measurement. Another limiting factor is that certain diseases affect the cornea in such a way that use of this type of apparatus is completely impossible. Thirdly, a pressure exerted on the cornea is disturbing and inconvenient to the patient.

The prior art does also include tonometers of another type comprising a probe contacting the eye and carrying out oscillations under the influence of a magnetic field generated by a coil traversed by an electrical current. It is known in tonometers of the latter type to use the driving coil also as a measuring coil for determining the dampening affect of the probe oscillations exerted by the eye. However, experience has shown that this entails a large spread of the measured values within the medium and low pressure intervals. In an effort to overcome this disadvantage such tonometers have been provided with an additional measuring coil sensing the oscillations of the probe and determining the resonance frequency of the system. However, neither this kind of instrument has proved suitable for clinical applications.

The chief object of the invention is to provide an apparatus suitable for clinical use and permitting continuous and accurate determination of the intraocular liquid pressure. A related object of the invention is to provide an instrument of the type here concerned which is of simple and sturdy design and highly apt for clinical use thus eliminating or greatly reducing the disadvantages and shortcomings of the prior art equipment.

BRIEF DESCRIPTION OF THE INVENTION

In accordance with the invention the intraocular pressure of the eye is measured by use of a probe contacting the eye and caused by a generator to carry out mechanical oscillations. The reactional pressure exerted by the eye against those oscillations is determined by means of a pressure-sensitive device connected between the generator and the probe.

BRIEF DESCRIPTION OF THE DRAWING

The attached drawing illustrates diagrammatically one embodiment of the invention.

DETAILED DESCRIPTION OF THE PRESENT INVENTION

Figure 1:
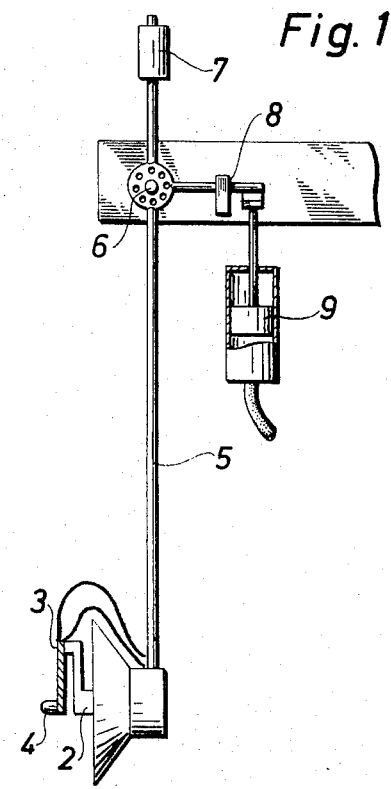
FIG. 1 is a lateral elevation of the instrument.

According to the embodiment shown on the drawing the apparatus comprises a loud-speaker 1 at the center of the diaphragm of which there is secured the one end of a small rod 2 preferably consisting of an artificial resin such as Plexiglass. The opposite end of rod 2 is connected to the one end of an elongated piezo-electrical crystal 3 which at its other end carries a probe 4, also preferably consisting of an artificial resin material. The unit comprising loud-speaker 1, rod 2, crystal 3 and probe 4 is mounted on an arm 5 which like a pendulum is swingable around a horizontal pivot 6. At the end of arm 5 located above pivot 6 there is a counter-weight 7 statically balancing unit 1–4 to the extent desired. Reference numeral 8 designates a further weight which is slidable along a rod perpendicular to arm 5. As is realized, weight 8 tends to swing unit 1–4 in the clockwise direction or, stated in other words, it biases the unit so that when arm 5 is substantially in a vertical position and probe 4 in contact with the cornea of the eye, the latter is subjected to an initial static pressure force. Numeral 9 refers to a hydraulic cylinder and piston device, the piston rod of which cooperates with horizontal rod carrying weight 8. The purpose of this arrangement will appear from the description below.

Pendulum arm 5, which so far has been blocked in an inactive position, is released whereupon probe 4 is softly brought into contact with the cornea. The corresponding movement has, of course, to be carried out slowly and with high accuracy and it is for that purpose controlled by means of the hydraulic device 9. As was indicated above, weight 8 is displaced along its rod so that the desired static content pressure between the probe and the eye is attained. Experiments have shown that a contact force within the approximate inverval 0.5–1 grams satisfies the condition that probe 4 must remain in contact with the cornea throughout the measuring procedure.

When the instrument has been initially adjusted as above accounted for, a dynamic pressure is superimposed upon the static pressure exerted by probe 4. For that purpose, loud-speaker 1 is activated so that its diaphragm starts oscillating. While this is no limiting factor, tests with one embodiment of the invention have shown that the frequency of the oscillations should be approximately 20 Hz. These oscillations are over rod 2 and the piezo-electrical crystal 3 transferred to probe 4 in contact with the cornea. The peak-to-peak amplitude of the oscillations, which can be of the order of 0.4 mils (0.01 mms), is attenuated very insignificantly when the probe is in established contact with the eye. On the other hand this slight reactional pressure exerted by the eye involves that the relatively rigid crystal 3 is subjected to bending stresses generating therein an electrical output signal. Provided that loud-speaker 1 is fed with a sinusoidal input signal and that probe 4 remains in contact with the cornea throughout the complete cycles of the oscillations, the output signal will exhibit a sinusoidal wave form as well. This is true from a purely theoretical standpoint. In practice the output signal is distorted under the influence of movements carried out by the eye in response to such phenomena as respiration, pulse beats, reflex movements of the eye bulb and the like. For that reason the output signal is, after having been amplified, supplied to a band-pass filter.

Figure 2:
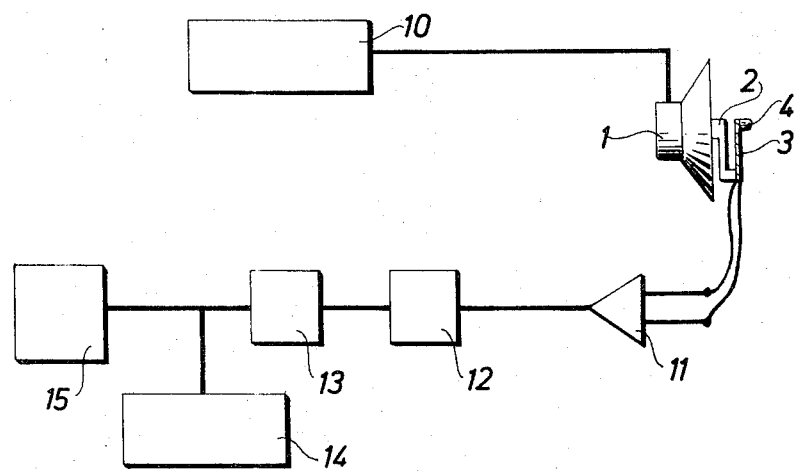
FIG. 2 is a block circuit diagram showing the design of the complete apparatus.

FIG. 2 illustrates in block form a circuit diagram of the complete system according to the illustrated embodiment. Reference numeral 10 designates a generator the output signal of which can be controlled and which is fed to loud-speaker 1, transforming the electrical oscillations into mechanical ones then transferred to the probe in the manner above described. As has also been explained above, the reactional pressure exerted by the eye against those mechanical oscillations causes the piezo-electrical crystal 3 to yield electrical output signals. Those signals are, over an amplifier 11 fed to a band-pass filter 12 the output signal of which is rectified in block 13. Finally, the rectified signal is recorded in unit 14. In addition thereto, this final output signal corresponding to the result of the measurement can be directly observed on the dial of an indicating instrument 15.

The measured value indicated or recorded is then relied upon for a calculation of the absolute value of the intraocular pressure. It can be shown mathematically that the relationship between that pressure and the value of the output signal from crystal 3 is a substantially linear function. Moreover, practical tests on subjects, the reactional pressure of which was known, have confirmed that this relationship holds true.

It is apparent to those skilled in the art that the values given above for the frequency and amplitude of the oscillations and for the contact force of the probe do only illustrate the orders of magnitudes concerned and have been found to give optimal results in use of one special embodiment of the invention. In practice those values can be varied within wide ranges chiefly in response to the exact nature of the measurement in question. The lateral contour and the cross-sectional profile of the surface of probe 4 contacting the cornea can also be varied to suit different applications. By way of example it could be mentioned here that while a part-spherical contact surface proved to require less accurate adjustment against the cornea than did probes having flat contact surfaces the latter yielded considerably higher output signals.

In the development of this invention experiments were carried out with ceramic piezo-electric crystals. It is, however, realized that any known or suitable components having such properties that they can yield an electrical output signal varying in response to external force or pressure can be utilized, such as pressure-sensitive capacitors. If such a replacement is made, it is necessary to a higher or lesser degree to modify the mounting means of the oscillation source. Also when a piezo-electrical crystal of the shape shown here is used it can be mounted in different positions including such in which it is subjected to longitudinal pressure components. Finally, it should be stressed that use of an ordinary loud-speaker as an oscillation source is advantageous chiefly on the ground that it constitutes a low-priced standard component readily accessibly on the open market meaning that any equivalent device capable of generating mechanical oscillations or vibrations can be used in lieu thereof.

What I claim is:

1. An apparatus for determining the intraocular pressure of the human eye, comprising a probe to be brought into contact with the eye, generator means for generating mechanical oscillations, means for transferring those oscillations to the probe wherein said generator means vibrates said probe at a substantially constant amplitude and frequency and pressure-sensitive means connected between said generator means and said probe to conduct the vibration of the probe and to generate an electrical signal as a function of the reactional pressure against the oscillations exerted by the eye.

2. An apparatus as claimed in claim 1, in which said pressure-sensitive means comprise a piezo-electric crystal.

3. An apparatus as claimed in claim 2, in which said crystal is of elongated form, its one end being connected to said generator means and its other end to said probe.

4. An apparatus as claimed in claim 1, in which the generator means, the pressure-sensitive means and the probe form a unit suspended by a pendulum permitting adjustment of the static contact pressure between the probe and the eye.

5. An apparatus as claimed in claim 4, in which said pendulum has a displaceable weight for adjustment of the static contact pressure.

* * * * *